(12) United States Patent
Pfaadt et al.

(10) Patent No.: US 7,994,240 B2
(45) Date of Patent: Aug. 9, 2011

(54) PROCESS FOR PRODUCING SHAPED BODIES FROM A MIXTURE OF PARTICULATE NATURAL MATERIALS AND THERMOPLASTIC BINDER

(75) Inventors: Marcus Pfaadt, Burghausen (DE); Thomas Funke, Sant Cugat del Valles (ES)

(73) Assignee: Wacker Chemie AG, Munich (DE)

( * ) Notice: Subject to any disclaimer, the term of this patent is extended or adjusted under 35 U.S.C. 154(b) by 102 days.

(21) Appl. No.: 12/279,137

(22) PCT Filed: Feb. 6, 2007

(86) PCT No.: PCT/EP2007/051092
§ 371 (c)(1),
(2), (4) Date: Aug. 12, 2008

(87) PCT Pub. No.: WO2007/093518
PCT Pub. Date: Aug. 23, 2007

(65) Prior Publication Data
US 2009/0131561 A1 May 21, 2009

(30) Foreign Application Priority Data
Feb. 13, 2006 (DE) .......................... 10 2006 006 580

(51) Int. Cl.
*B29C 47/00* (2006.01)
*C08J 9/04* (2006.01)
*C08J 5/02* (2006.01)
*C08L 53/02* (2006.01)

(52) U.S. Cl. ............... 524/13; 524/35; 524/197; 524/72; 524/612; 524/765; 524/803; 524/130; 526/287

(58) Field of Classification Search .................. 524/13, 524/35, 197, 72, 612, 765, 803, 130; 526/287
See application file for complete search history.

(56) References Cited

U.S. PATENT DOCUMENTS 6,348,530 B1    2/2002  Reck et al.
6,559,259 B2 *  5/2003  Kohlhammer et al. ........ 526/287
6,639,049 B2   10/2003  Weitzel
6,716,922 B1    4/2004  Dreher et al.
2004/0097645 A1*  5/2004  Weitzel et al. ................. 524/803
2006/0173105 A1*  8/2006  Griffin et al. .................... 524/35
2006/0208387 A1  9/2006  Zodl
2006/0258783 A1  11/2006  Rettenbacher
2006/0264539 A1  11/2006  Mosseveld et al.
2007/0129486 A1*  6/2007  Klein et al. ..................... 524/563
2009/0131561 A1  5/2009  Pfaadt

FOREIGN PATENT DOCUMENTS

DE      30 25 522 A    2/1982
DE      197 29 161 A   1/1999
DE      199 49 593 A   4/2001
EP      1984453 B1     6/2010
WO      96/34045 A     10/1996
WO      03/008494 A    1/2003
WO      03/035373 A    5/2003
WO      2004/085533 A  10/2004
WO      2004/090022 A  10/2004

OTHER PUBLICATIONS

Fox, T.G., "Influence of Diluent and of Copolymer Composition on the Glass Temperature of a Polymer System," Bull. Am. Physics Soc. 1 (1956), p. 123.
Lee, W.A., "The Glass Transition Temperatures of Polymers," Polymer Handbook, 2d ed., J. Wiley & Sons (1975), pp. 139-191.
Schulze, J. "Redispersionspulver im Zement," TIZ, No. 9, 1985, pp. 3-14 (plus cover page) (and English Abstract).
English Abstract corresponding to DE 30 25 522 A, Feb. 18, 1982.
English Abstract corresponding to WO 03/008494 A, Jan. 30, 2003.

* cited by examiner

*Primary Examiner* — James Seidleck
*Assistant Examiner* — Deve Valdez
(74) *Attorney, Agent, or Firm* — Brooks Kushman P.C.

(57) ABSTRACT

Use of water redispersible polymer powders stabilized with a protective colloid as a thermoplastic binder for natural particulate materials allows thermoplastic processing such as extrusion, without formation of bubbles due to moisture present, and while maintaining physical properties.

14 Claims, No Drawings

PROCESS FOR PRODUCING SHAPED BODIES FROM A MIXTURE OF PARTICULATE NATURAL MATERIALS AND THERMOPLASTIC BINDER

CROSS-REFERENCE TO RELATED APPLICATION

This application is the U.S. national phase of PCT Appln. No. PCT/EP2007/051092 filed Feb. 6, 2007 which claims priority to German application DE 10 2006 006 580.8 filed Feb. 13, 2006.

BACKGROUND OF THE INVENTION

1. Field of the Invention

The invention relates to a process for the production of mouldings from a mixture of particulate natural materials and thermoplastic binder, the mixture being shaped into a moulding by means of increased temperature and/or pressure.

2. Description of the Related Art

Natural fibres, in particular wood fibres, have recently increasingly been used in combination with thermoplastics for the production of wood plastic composites. For this purpose, the wood fibres or wood flour are mixed with a thermoplastic binder and processed by means of extrusion to give mouldings. WO-A 96/34045 discloses a process for the production of mouldings, in which natural fibre materials are processed as a mixture with thermoplastics. The preparation of plastic moulding materials by extrusion of a mixture of natural fibre and thermoplastic is also disclosed in WO-A 03/008494. The natural fibre content is introduced in the form of pellets bound with thermoplastic.

These natural substances which are present, for example, in the form of wood fibres, wood flour or woodchips, contain a considerable amount of residual moisture in the air-dry state. Thermoplastics, such as polyolefins, polyvinyl chloride or ABS, are not capable of absorbing the water released during processing in an amount significant for the process. In thermoplastic processing of mixtures of such natural substances and thermoplastics, for example by means of extrusion, the residual water present therefore leads to uncontrolled bubble formation in the mouldings, owing to the abrupt vaporization occurring at the processing temperatures. This can take place to such an extent that the cohesion of such a moulding is no longer guaranteed.

WO-A 03/035373 and WO-A 2004/090022 therefore propose additionally using a water-binding biopolymer, starch or protein, in the production of mouldings from natural fibre and thermoplastic. A disadvantage thereby is that the mixture also comprises a third component in addition to the natural fibre and the thermoplastic binder, and the strength of the moulding is reduced.

SUMMARY OF THE INVENTION

It was therefore an object to provide a process for the production of mouldings from natural fibre material and thermoplastic binder, which leads to mouldings having a high mechanical strength, and in which no additional process steps are required for removing the residual water nor are any additives required for binding residual water. These and other objects are achieved by the use of a thermoplastic binder in the form of a water redispersible polymer powder stabilized by a protective colloid.

DETAILED DESCRIPTION OF THE PREFERRED EMBODIMENTS

The invention thus relates to a process for the production of mouldings from a mixture of particulate natural materials and thermoplastic binder, the mixture being shaped into a moulding at increased temperature and/or pressure, wherein the thermoplastic binder is used in the form of a polymer powder composition redispersible in water, containing one or more polymers, one or more protective colloids and optionally antiblocking agent(s)

Suitable particulate natural materials are, for example, wood fibres, wood flour and woodchips. Vegetable natural materials, such as cotton fibres, jute fibres, sisal fibres, hemp fibres, flax fibres and wood fibres and wood flour, are preferred. The proportion of the natural materials in the mixture to be processed by a thermoplastic method is 20 to 98% by weight, preferably 50 to 80% by weight, based in each case on the total weight of the mixture.

Polymer powders redispersible in water are defined as powder compositions which are obtainable by means of drying of the corresponding aqueous dispersions of the base polymers in the presence of protective colloids. On the basis of this preparation process, the finely divided resin of the dispersion is surrounded by a sufficient amount of a water-soluble protective colloid. During drying, the protective colloid acts as a jacket which prevents the particles from sticking together. On redispersion in water, the protective colloid dissolves again in water and an aqueous dispersion of the original polymer particles is produced (Schulze J. in TIZ, No. 9, 1985).

Suitable polymers are those based on one or more monomers from the group of vinyl esters, (meth)acrylates, vinylaromatics, olefins, 1,3-dienes and vinyl halides and optionally further monomers copolymerizable therewith.

Suitable vinyl esters are those of carboxylic acids having 1 to 12 C atoms. Vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 C atoms, for example VeoVa9® or VeoVa10® (trade names of Resolution) are preferred. Vinyl acetate is particularly preferred.

Suitable monomers from the group of acrylates or methacrylates are esters of straight-chain or branched alcohols having 1 to 15 C atoms. Preferred methacrylates or acrylates are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, 2-ethylhexyl acrylate. Methyl acrylate, methyl methacrylate, n-butyl acrylate, tert-butyl acrylate and 2-ethylhexyl acrylate are particularly preferred.

Preferred vinylaromatics are styrene, methylstyrene and vinyltoluene. A preferred vinyl halide is vinyl chloride. The preferred olefins are ethylene and propylene, and the preferred dienes are 1,3-butadiene and isoprene.

Optionally, 0.1 to 5% by weight, based on the total weight of monomer mixture, of auxiliary monomers may also be copolymerized; 0.5 to 2.5% by weight of auxiliary monomers are preferably used. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric acid and maleic acid, such as the diethyl and diisopropyl esters, and maleic anhydride, ethylenically unsaturated sulphonic acids or salts thereof, preferably vinylsulphonic acid and 2-acrylamido-2-methylpropanesulphonic acid. Further examples are precrosslinking comonomers, such as polyethylenically unsaturated comonomers, for example diallyl phthalate, divinyl adipate, diallyl maleate, allyl methacrylate or triallyl cyanurate, or postcrosslinking comonomers, for example acrylamidoglycolic acid (AGA), methylacrylamidoglycolic acid methyl ester (MAGME), N-methylolacrylamide (NMA), N-methylolmethacrylamide, N-methylolallyl carbamate, alkyl ethers such as the isobutoxy ether or esters of N-methylolacrylamide, of N-methylolmethacrylamide and of N-methylolallyl carbamate. Epoxide-functional comonomers, such as glycidyl methacrylate and glycidyl acrylate, are also suitable. Further examples are silicon-functional comonomers, such as acryloyloxypropyltri(alkoxy)silanes and methacryloyloxypropyltri(alkoxy)silanes, vinyltrialkoxysilanes and vinylmethyldialkoxysilanes, it being possible, for example, for ethoxy and ethoxypropylene glycol ether radicals to be present as alkoxy groups. Monomers having hydroxyl or CO groups, for example hydroxyalkyl methacrylates and acrylates, such as hydroxyethyl, hydroxypropyl or hydroxybutyl acrylate or methacrylate, and compounds such as diacetoneacrylamide and acetylacetoxyethyl acrylate or methacrylate may also be mentioned.

The choice of monomers or the choice of the proportions by weight of the comonomers is effected so that in general a glass transition temperature Tg of <120° C., preferably −40° C. to +120° C., and more preferably −20° C. to +80° C., results. The glass transition temperature Tg of the polymers can be determined in a known manner by means of differential scanning calorimetry (DSC). The Tg can also be calculated approximately in advance by means of the Fox equation. According to Fox T. G., Bull. Am. Physics Soc. 1, 3, page 123 (1956), the following is true: $1/Tg = x1/Tg1 + x2/Tg2 + \ldots + xn/Tgn$, where xn represents the mass fraction (% by weight/100) of the monomer n and Tgn is the glass transition temperature in Kelvin of the homopolymer of the monomer n. Tg values for homopolymers are mentioned in Polymer Handbook 2nd Edition, J. Wiley & Sons, New York (1975).

Homo- or copolymers which contain one or more monomers from the group of vinyl acetate, vinyl esters of α-branched monocarboxylic acids having 9 to 11 C atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and styrene are preferred. Particularly preferred are copolymers of vinyl acetate and ethylene; of vinyl acetate, ethylene and a vinyl ester of α-branched monocarboxylic acids having 9 to 11 C atoms; of n-butyl acrylate and 2-ethylhexyl acrylate and/or methyl methacrylate; of styrene and one or more monomers from the group of methyl acrylate, ethyl acrylate, propyl acrylate, n-butyl acrylate, and 2-ethylhexyl acrylate; of vinyl acetate and one or more monomers from the group of methyl acrylate, ethyl acrylate, propyl acrylate, n-butyl acrylate, 2-ethylhexyl acrylate and optionally ethylene; of 1,3-butadiene and styrene and/or methyl methacrylate and optionally further acrylates; it also being possible for these monomer mixtures optionally to contain one or more of the abovementioned auxiliary monomers.

The preparation of the polymers is effected by the emulsion polymerization process or by the suspension polymerization process in the presence of protective colloids, preferably by the emulsion polymerization process, the polymerization temperature being in general 20° C. to 100° C., preferably 60° C. to 90° C., and, in the copolymerization of gaseous comonomers such as ethylene, it also being possible to work under pressure, in general between 5 bar and 100 bar. The initiation of the polymerization is effected with the water-soluble or monomer-soluble initiators or redox initiator combinations customary for emulsion polymerization or suspension polymerization. Examples of water-soluble initiators are sodium persulphate, hydrogen peroxide and azobisisobutyronitrile. Examples of monomer-soluble initiators are dicetyl peroxydicarbonate, dicyclohexyl peroxydicarbonate and dibenzoyl peroxide. The initiators are used in general in an amount of 0.01 to 0.5% by weight, based on the total weight of the monomers. Redox initiators used are combinations of the foregoing initiators in combination with reducing agents. Suitable reducing agents are, for example, sodium sulphite, sodium hydroxymethanesulphinate and ascorbic acid. The amount of the reducing agent is preferably 0.01 to 0.5% by weight, based on the total weight of the monomers.

For controlling the molecular weight, regulating substances may be used during the polymerization. If regulators are used, they are usually employed in amounts of from 0.01 to 5.0% by weight, based on the monomers to be polymerized, and are metered separately or premixed with reaction components. Examples of such substances are n-dodecyl mercaptan, tert-dodecyl mercaptan, mercaptopropionic acid, methyl mercaptopropionate, isopropanol and acetaldehyde. Preferably, no regulating substances are used.

For stabilizing the polymerization batch, protective colloids are used, optionally in combination with emulsifiers. Suitable protective colloids are partly hydrolysed or completely hydrolysed polyvinyl alcohols; polyvinylpyrrolidones; polyvinyl acetals; polysaccharides in water-soluble form, such as starches (amylose and amylopectin), celluloses and the carboxymethyl, methyl, hydroxyethyl and hydroxypropyl derivatives thereof; proteins, such as casein or caseinate, soya protein, gelatine; ligninsulphonates; synthetic polymers, such as poly(meth)acrylic acid, copolymers of (meth)acrylates with carboxy-functional comonomer units, poly(meth)acrylamide, polyvinylsulphonic acids and the water-soluble copolymers thereof; melamine-formaldehyde sulphonates, naphthalene-formaldehyde sulphonates, and styrene/maleic acid and vinyl ether/maleic acid copolymers. Partly hydrolysed or completely hydrolysed polyvinyl alcohols are preferred. Partly hydrolysed polyvinyl alcohols having a degree of hydrolysis of 80 to 95 mol % and a Höppler viscosity in 4% strength aqueous solution of 1 to 30 mPa·s (Höppler method at 20° C., DIN 53015) are particularly preferred.

After the end of the polymerization, post polymerization can be effected using known methods, for example by post polymerization initiated with a redox catalyst, for removing residual monomers. Volatile residual monomers can also be removed by means of distillation, preferably under reduced pressure, and optionally while passing through or passing over inert entraining gases, such as air, nitrogen or steam. The aqueous dispersions obtainable therewith have a solids content of 30 to 75% by weight, preferably of 50 to 60% by weight.

For the preparation of the polymer powder compositions redispersible in water, the dispersions are dried, for example, by means of fluidized-bed drying, freeze drying or spray drying, optionally after addition of further protective colloids as a drying aid. The dispersions are preferably spray-dried. The spray drying is effected in customary spray drying units, it being possible to effect the atomization by means of airless, binary or multi-material nozzles or by means of a rotating disc. The exit temperature is generally chosen to be in the range from 45° C. to 120° C., preferably 60° C. to 90° C., depending on unit, Tg of the resin and desired degree of drying. The viscosity of the feed to be atomized is adjusted by means of the solids content so that a value of <500 mPa·s (Brookfield viscosity at 20 revolutions and 23° C.), preferably <250 mPa·s, is obtained. The solids content of the dispersion to be atomized is >35%, preferably >40%.

As a rule, the drying aid is used in a total amount of 0.5 to 30% by weight, based on the polymeric constituents of the dispersion. This means that the total amount of protective colloid before the drying process should be at least 1 to 30% by weight, based on the proportion of polymer; 5 to 20% by weight, based on the proportion of polymer, are preferably used.

Suitable drying aids are, for example, the abovementioned protective colloids.

In the atomization, a content of up to 1.5% by weight of antifoam, based on the base polymer, has often proved to be advantageous. In order to increase the storability by improving the stability to blocking, in particular in the case of powders having a low glass transition temperature, the powder obtained can be treated with an antiblocking agent (anticaking agent), preferably 1 to 30% by weight, based on the total weight of polymeric constituents. Examples of antiblocking agents are Ca and Mg carbonate, talc, gypsum, silica, kaolins, such as metakaolin, silicates having particle sizes preferably in the range from 10 nm to 10 µm.

Most preferred are redispersion powder compositions containing copolymers with vinyl acetate and ethylene or copolymers with vinyl acetate, ethylene and a vinyl ester of α-branched monocarboxylic acids having 9 to 11 C atoms as a film-forming polymer and partly hydrolysed polyvinyl alcohol as a protective colloid.

The proportion of the water-redispersible polymer powder compositions in the mixture to be thermplastically processed is 1 to 80% by weight, preferably 5 to 50% by weight, and most preferably from 10 to 40% by weight, based in each case on the total weight of the mixture. The redispersible polymer powder compositions can also be used as a mixture with conventional, non-redispersible thermoplastics. Examples of conventional thermoplastics are polyethylene, polypropylene, PVC, ABS and polyvinyl acetate solid resin. The proportion by weight of these thermoplastics in the mixture with the redispersible polymer powder preferably should not exceed 70% by weight. Optionally, the redispersible polymer powder may also be used as a mixture with crosslinking agents. Examples of these are epoxide crosslinking agents, such as Epicote.

Optionally, further additives customary in the thermoplastic processing of plastics may also be present in the mixture. Examples of these are dyes, pigments, stabilizers, plasticizers, lubricants and flameproofing agents.

For the production of the mouldings, the particulate natural materials and the polymer powder composition redispersible in water, and optionally further additives, are mixed with one another, for example in a hot mixer, and processed by means of the customary thermoplastic shaping techniques to give mouldings. Preferably, the processing is effected by means of extrusion with appropriate devolatilization zone and injection moulding. The processing temperature is in general 60° C. to 200° C., preferably 90° C. to 150° C. The procedure is preferably effected at elevated pressure, preferably at pressures of 10 to 600 bar abs. The production of the mouldings can also be effected via the granule stage.

Surprisingly, it has been found that, with the use of a polymer powder composition redispersible in water, no predrying of air-dried wood having a water content of about 8% by weight and no addition of water-binding additives are required in the thermoplastic processing. The production of mouldings is therefore considerably facilitated by the process according to the invention.

The following examples serve for further explaining the invention:

The following constituents were used for testing:

RC Powder 1 (RDP 1):
Dispersion powder stabilized with polyvinyl alcohol and based on a polyvinyl acetate homopolymer having a Tg=30° C. (Vinnex® LL 2510 from Wacker Chemie AG).

RD Powder 2 (RDP 2):
Dispersion powder stabilized with polyvinyl alcohol and based on an ethylene/vinyl acetate copolymer having a Tg=–7° C. (Vinnex® LL 2504 from Wacker Chemie AG).

Comparative Thermoplastic (CT):
Polyvinyl acetate solid resin having a Tg=30° C. (Vinnapas® UW 1 from Wacker Chemie AG).

Wood Fibre (Air-Dried):
Lignocel@ BK 40/90 from Rettenmaier

Starch:
Emsize® E9 from Emsland Starke

Pigment:
Titanium dioxide Kronos® 2000 from Kronos.

Lubricant:
Calcium stearate Caesit® 1 from Barlocher.

Rigid profiles (Table 1) and flexible profiles (Table 2) were produced by means of extrusion.

For this purpose, the mixtures stated in the tables, in the amounts stated there (parts by weight), were processed using a twin-screw extruder having counterrotating screws to give profiles. The processing temperature was 100° C. to 130° C.

The mixtures were also processed on an injection moulding unit.

The extrudability, the injection mouldability and the bubble formation during the extrusion were visually assessed.

The mechanical properties, such as modulus of elasticity (E modulus) and flexural strength (FS) were determined on pressed sheets measuring 80 mm×10 mm×4 mm according to DIN EN ISO 178.

The results are summarized in Tables 1 and 2:

TABLE 1

| Rigid profile | Ex. 1 | Ex. 2 | Comp. 3 | Comp. 4 |
| --- | --- | --- | --- | --- |
| RDP 1 [parts by wt.] | 25 | 25 | | |
| VT PVAC [parts by wt.] | | | 25 | 25 |
| Wood fibres [parts by wt.] | 55 | 75 | 55 | 75 |
| Starch [parts by wt.] | 20 | | 20 | |
| Additives [parts by wt.] | 4 | 4 | 4 | 4 |
| E-Modulus [N/mm$^2$] | 5170 | 6160 | 6000 | 6450 |
| FS [N/mm$^2$] | 63 | 65 | 65 | 65 |
| Extrudability | very | very | good | poor |
| Injection mouldability | good | good | | |
| Bubble formation | no | no | no | yes |

The results show that, with the use of redispersible thermoplastics as binders, the extrudability and injection mouldability and the properties of the end product are substantially improved compared with conventional thermoplastic. This is clear especially in the case of the formulations without added starch: a non-redispersible PVAC solid resin cannot absorb the water liberated from the wood during the processing, which results in increased bubble formation and limited cohesion of the profile geometry.

TABLE 2

| Flexible profile | Ex. 5 | Ex. 6 |
| --- | --- | --- |
| RDP 2 [parts by wt.] | 25 | 25 |
| Wood fibre [parts by wt.] | 55 | 75 |

TABLE 2-continued

| Flexible profile | Ex. 5 | Ex. 6 |
| --- | --- | --- |
| Starch [parts by wt.] | 20 | |
| Additives [parts by wt.] | 4 | 4 |
| E-Modulus [N/mm$^2$] | 2000 | 2217 |
| FS [N/mm$^2$] | 1.9 | 1.9 |
| Extrudability | very good | very good |
| Injection mouldability | | |
| Bubble formation | no | no |

The results with a soft, flexible binding powder having a Shore hardness of A90 show that very good processability and very good mechanical properties result even without the use of water-binding starch.

The invention claimed is:

1. A process for the production of mouldings from a mixture of particulate natural materials and thermoplastic binder without added starch, comprising shaping the mixture into a moulding under an elevated temperature of 60° C. to 200° C. and/or a pressure of 10 bar to 600 bar absolute, wherein the thermoplastic binder comprises a water redispersible polymer powder composition containing a) at least one polymer derived from one or more monomers of vinyl esters, (meth)acrylates of unbranched or branched alcohols having 1 to 15 C atoms, vinylaromatics, olefins, 1,3-dienes, and vinyl halides, and optionally 0.1 to 5% by weight based on the total weight of monomer mixture, of auxiliary monomers, b) one or more protective colloids selected from the group consisting of partly hydrolysed or completely hydrolysed polyvinyl alcohols, polyvinylpyrrolidones, polyvinyl acetals, celluloses and derivatives thereof, proteins, lignin sulphonates, poly(meth)acrylamide, polyvinylsulphonic acids and the water-soluble copolymers thereof, melamine formaldehyde sulphonates, and naphthalene formaldehyde sulphonates as protective colloid(s), and c) 1 to 30% by weight of antiblocking agent, based on the weight of polymer.

2. The process of claim 1, wherein at least one polymer from the group consisting of vinyl acetate homopolymers, copolymers of vinyl acetate and ethylene, copolymers of vinyl acetate, ethylene and a vinyl ester of α-branched monocarboxylic acids having 9 to 11 C atoms, copolymers of n-butyl acrylate and 2-ethylhexyl acrylate and/or methyl methacrylate, copolymers of styrene and one or more monomers from the group consisting of methyl acrylate, ethyl acrylate, propyl acrylate, n-butyl acrylate, 2-ethylhexyl acrylate, copolymers of vinyl acetate and one or more monomers from the group consisting of methyl acrylate, ethyl acrylate, propyl acrylate, n-butyl acrylate, 2-ethylhexyl acrylate and optionally ethylene, and copolymers of 1,3-butadiene and styrene and/or methyl methacrylate and optionally further acrylates, is present.

3. The process of claim 1, wherein natural fibres are used as particulate natural materials.

4. The process of claim 1, wherein natural fibres are used as particulate natural materials.

5. The process of claim 1, wherein wood fibres, wood flour or woodchips are used as particulate natural materials.

6. The process of claim 2, wherein wood fibres, wood flour or woodchips are used as particulate natural materials.

7. The process of claim 3, wherein wood fibres, wood flour or woodchips are used as particulate natural materials.

8. The process of claim 4, wherein wood fibres, wood flour or woodchips are used as particulate natural materials.

9. The process, of claim 1, wherein the water redispersible polymer powder composition is used as a mixture with thermoplastics which are not redispersible in water.

10. The process of claim 1, wherein the protective colloid(s) are selected from the group consisting of partly and completely hydrolyzed polyvinyl alcohols.

11. The process of claim 1, wherein the polymer consists of a polyvinyl acetate homopolymer.

12. The process of claim 1, wherein the polymer a) consists of an ethylene/vinyl acetate copolymer.

13. The process of claim 10, wherein the polymer consists of a polyvinyl acetate homopolymer.

14. The process of claim 10, wherein the polymer consists of an ethylene/vinyl acetate copolymer.

* * * * *

UNITED STATES PATENT AND TRADEMARK OFFICE
CERTIFICATE OF CORRECTION

| | | |
|---|---|---|
| PATENT NO. | : 7,994,240 B2 | Page 1 of 1 |
| APPLICATION NO. | : 12/279137 | |
| DATED | : August 9, 2011 | |
| INVENTOR(S) | : Marcus Pfaadt et al. | |

It is certified that error appears in the above-identified patent and that said Letters Patent is hereby corrected as shown below:

Column 8, Line 15, Claim 4:

After "The process of claim" Delete "1"
and Insert -- 2 --.

Signed and Sealed this
Eighteenth Day of October, 2011

David J. Kappos
*Director of the United States Patent and Trademark Office*